(12) United States Patent
Early

(10) Patent No.: US 7,918,051 B2
(45) Date of Patent: Apr. 5, 2011

(54) TOMATO GROWING SYSTEM

(75) Inventor: Jonathan Early, Sonoma, CA (US)

(73) Assignee: The Bear Flag 1991 Trust, Sonoma, CA (US)

( * ) Notice: Subject to any disclaimer, the term of this patent is extended or adjusted under 35 U.S.C. 154(b) by 0 days.

(21) Appl. No.: 11/820,529

(22) Filed: Jun. 19, 2007

(65) Prior Publication Data

US 2008/0263949 A1 Oct. 30, 2008

Related U.S. Application Data

(60) Provisional application No. 60/830,876, filed on Jul. 13, 2006.

(51) Int. Cl.
*A01G 17/06* (2006.01)
*A01G 17/14* (2006.01)

(52) U.S. Cl. ............... 47/45; 47/83; 47/66.7; 248/27.8; 248/163.2; 211/118

(58) Field of Classification Search .......... 47/45, 70, 47/82, 83, 39, 41.14, 44, 47, 65, 65.5, 65.8, 47/66.7, 67, 73, 74, 65.7, 66.6, 66.3; 248/128, 248/146, 27.8, 512, 177.1, 318, 163.1, 163.2, 248/431, 165, 150, 151, 155.4; 211/198, 211/118, 119, 195, 181.1
See application file for complete search history.

(56) References Cited

U.S. PATENT DOCUMENTS

| 85,244 | A | | 12/1868 | Rowley | |
|---|---|---|---|---|---|
| 366,833 | A | * | 7/1887 | Hipwell | 248/431 |
| 505,797 | A | * | 9/1893 | Wastall | 5/128 |
| 963,030 | A | * | 7/1910 | Balch | 126/30 |
| 1,025,073 | A | | 4/1912 | Ragan | |
| 1,464,801 | A | | 8/1923 | Beers | |
| 2,000,911 | A | | 5/1935 | Balousek | |

(Continued)

FOREIGN PATENT DOCUMENTS

GB 2200024 7/1988

(Continued)

OTHER PUBLICATIONS

Printout of website page, tomato-cages.com, Veggie Cage The Revolutionary New Plant Support for Growing Tomatoes, date unknown.

*Primary Examiner* — Andrea M Valenti
(74) *Attorney, Agent, or Firm* — Thomas M. Freiburger

(57) ABSTRACT

A plant growing kit, primarily for growing climbing plants such as tomatoes, is contained in a flat box approximately the shape of a pizza box. In preferred embodiments three legs are included, broken down into sections in the box and directable into a sturdy tripod, over which a flexible vine-attachment element, such as a wire or thin tubular member or plastic coil, is assembled preferably in a tapered helical configuration. Also in the box is a basket, in flattened condition but erectable into a deep configuration and with provision for attachment to the legs, near their bottom ends, the basket being configured to contain a bag of soil, which may remain in the bag. The consumer provides drainage holes in the bag and an opening at top for the plants to grow and to climb up on the tripod and vine-attachment element. With a water-catching saucer under the bag and basket, the directed plant growing assembly can be placed in any desired location, including inside a building.

24 Claims, 3 Drawing Sheets

U.S. PATENT DOCUMENTS

| | | | |
|---|---|---|---|
| 2,577,373 A | | 12/1951 | Smith |
| 3,264,783 A | * | 8/1966 | Bayliss ............................... 47/45 |
| 3,613,970 A | * | 10/1971 | Humlong ........................ 224/434 |
| 3,627,242 A | * | 12/1971 | Vandermast ..................... 248/97 |
| D222,949 S | * | 2/1972 | Souder ........................ D11/148 |
| 3,677,867 A | * | 7/1972 | Westlind ............................ 428/9 |
| 3,775,903 A | * | 12/1973 | Pike ................................ 47/65.8 |
| 3,803,759 A | * | 4/1974 | Heinecke ............................ 47/47 |
| D241,567 S | | 9/1976 | England |
| 4,019,280 A | * | 4/1977 | Summers ............................ 47/45 |
| 4,081,148 A | | 3/1978 | Murphy |
| D248,002 S | * | 5/1978 | Staub et al. .................... D6/513 |
| 4,841,670 A | | 6/1989 | Bitter |
| 4,858,380 A | | 8/1989 | Gayle |
| 4,860,489 A | | 8/1989 | Bork |
| 4,914,857 A | * | 4/1990 | Dodgen ............................. 47/47 |
| 4,941,283 A | * | 7/1990 | Armstrong ........................ 47/67 |
| 4,968,541 A | * | 11/1990 | McCrory ........................... 428/9 |
| 5,174,060 A | | 12/1992 | Glamos |
| 5,179,799 A | * | 1/1993 | Hillestad ............................ 47/45 |
| 5,193,306 A | | 3/1993 | Whisenant |
| 5,241,783 A | | 9/1993 | Krueger |
| 5,393,023 A | * | 2/1995 | Callan .............................. 248/97 |
| 5,412,905 A | * | 5/1995 | Allison ............................... 47/30 |
| 5,423,148 A | * | 6/1995 | Thornhill ........................ 47/29.1 |
| D359,929 S | * | 7/1995 | Thornhill ..................... D11/143 |
| 5,471,788 A | * | 12/1995 | Willes ................................ 47/75 |
| 5,495,692 A | * | 3/1996 | LoJacono, Jr. ..................... 47/78 |
| 5,640,802 A | * | 6/1997 | Elliott ................................ 47/45 |
| 6,088,956 A | | 7/2000 | Rocka |
| 6,280,803 B1 | * | 8/2001 | Gordy, Jr. ......................... 428/18 |
| 6,922,943 B1 | | 8/2005 | Paille et al. |
| 7,281,352 B2 | * | 10/2007 | Peck ................................... 47/47 |
| 2001/0037599 A1 | * | 11/2001 | McIntyre ........................... 47/67 |
| 2004/0244286 A1 | * | 12/2004 | Sedlacek ........................... 47/47 |
| 2006/0005466 A1 | * | 1/2006 | Atchley ............................. 47/39 |
| 2007/0193113 A1 | * | 8/2007 | Shelton ............................. 47/45 |

FOREIGN PATENT DOCUMENTS

| | | |
|---|---|---|
| GB | 2237964 | 5/1991 |
| JP | 06113681 A * | 4/1994 |
| JP | 11239421 A * | 9/1999 |

* cited by examiner

TOMATO GROWING SYSTEM

This application claims benefit of provisional application Ser. No. 60/830,876, filed Jul. 13, 2006.

BACKGROUND AND SUMMARY OF THE INVENTION

This invention concerns the growing of plants in containers, and more specifically relates to a collapsible, compactly storable tower or cage particularly for climbing plants.

Growing tomatoes requires the use of some sort of cage (tower) to support the vines during growth and to keep them off the ground. Indeterminate (as opposed to determinate) tomatoes are particularly prone to vine like growth. Before the end of the growing season the weight of the vines tend to tip over a conventional tomato cage. At the end of the growing season unruly vines must be uprooted, disposed of and the cumbersome cages stored until the next season. Conventional cages can consist of simple cylinders of wire mesh or wire contraptions purchased at a nursery that are clumsy and unwieldy to stow.

Tomato plants are also vulnerable to rabbits, squirrels and subterranean vermin such as moles, voles and gofers.

Growing tomatoes is limited to in-ground planting or in large pots for patio and balcony cultivation.

Because of inherent limitations, tomatoes are not generally grown inside residences.

By placing a bag of potting soil (one or two cubic foot size, top of bag opened and the bottom perforated for water drainage) into a mesh basket (e.g, about 14-16" wide and 14-18" high, designed to collapse for storage such as chain mail) that has a small enough mesh to thwart vermin and by affixing the baskets upper rim to the inside legs (for stability) of a tripod that is approximately six feet high in height and by draping a tapered coil (metal or plastic, designed for this purpose) around the outside of the tripod from the top to near the bottom of the tripod in order to support the growth of the plant that is planted in the bag of potting soil, all of the problems stated above are dealt with in an original, simple manner.

With the system of the invention, vermin cannot penetrate the mesh basket. Tomato vines are supported by the coil during growth and propagation. Location is versatile, in that tomatoes (or other plants) can be just as easily grown outdoors on top of the ground, or on patios, balconies, rooftops or indoors.

At the end of the season, vines are trimmed and placed in a garbage bag or compost pile and the spent bag of potting soil with the root ball can be easily disposed of or the soil cleaned and recycled. An important feature of the invention is that the basket will collapse flat, the coil will collapse flat, the tripod can be broken down into sections, and all can be stored in a small flat box (similar to a pizza box) or other container until the next season.

The invention is unique in many respects. It utilizes a freestanding (unpotted) bag of potting soil for the growing medium, and involves a mesh or similar basket attached to the tripod for stability, the basket retaining the bag of soil. The weight of the bag of potting soil in the mesh basket further solidifies and stabilizes the tripod. The mesh basket also will thwart vermin, as noted above. A further unique feature is the coil used in conjunction with the tripod as a stable tomato cage and climbing element. By utilizing a saucer to catch water under the mesh basket, the tomato cage of the invention can conveniently be used indoors even on wood or carpeted floors, like a house plant. A very important advantage is the ability to collapse the entire mechanism into a compact and reusable package for storage.

Plants other than tomatoes can also be grown in the device of the invention. Examples are beans, tomatillos and other vines, including climbing flowers such as morning-glories. With baskets at two or three levels, non-climbing plants can be grown on the device.

Although a potting soil bag is preferably preferred, a standard planting pot, such as a clay pot, could be placed within the basket.

In one embodiment of the invention, the coil for climbing can comprise a tubular, clear foil that houses a string of small grow lights similar to certain twinkle light designs. Accessories that can be included with the kit or system include feet for the tripod, to reduce the risk of sinking into soft soil. The feet can also double as a cap for the top of the tripod if it utilizes a base designed with three holes in suitable arrangement for receiving the top ends of the tripod legs. Further, the three holed foot will allow for multiple tripods to be clipped and grouped together, for further stability.

In another aspect of the invention, the kit of parts sold in a compact package or box can include some but not all of the above described components. Within this minimal package are a freestanding collapsible basket and some form of frame or footing to hold the basket in an erected condition in which it can retain a bag of soil with a plant or plants rooted in the soil. The basket and support are both collapsible or dismantleable so as to be compactly stored in a flattened condition in a relatively thin box or package.

As discussed above, tomato cages are in themselves well known. Such cages for tomatoes or other climbing plants are shown, for example, in U.S. Pat. Nos. 6,922,943, 6,088,956, 5,174,060, 4,860,489, 4,858,380, 4,841,670, 4,081,148, 4,019,280, 2,577,373, 2,000,911, 1,025,073, 85,244, and DES. 241,567. See also U.K. published patent application No. GB 2237964. Some of the above included provision for collapsing the cage or tower.

Other patents disclosing growing of plants confined by wire baskets or in a bag or similar device, or simply showing wire basket apparatus, include U.S. Pat. Nos. 5,495,692, 5,241,783, 5,193,306, and 1,464,801, as well as U.K. published application No. GB 2200024. See also "Veggie Cage The Revolutionary New Plant Support For Growing Tomatoes", on the web site tomato-cages.com, disclosing an expandable tapered helical tomato cage device.

It is an object of the current invention to simplify the growing of tomatoes and other similar climbing plants, and to provide versatility to grow such plants nearly anywhere, as described above, while providing the entire set of components, excluding the soil, in a flattened condition suitable for storage in a box generally about the size of a pizza box. These and other objects, advantages and features of the invention will be apparent from the following description of preferred embodiments, considered along with the accompanying drawings.

DESCRIPTION OF THE DRAWINGS

FIG. 1A is a perspective view showing a form of leg clamp that can be used with the invention.

DESCRIPTION OF PREFERRED EMBODIMENTS

Figure 1:
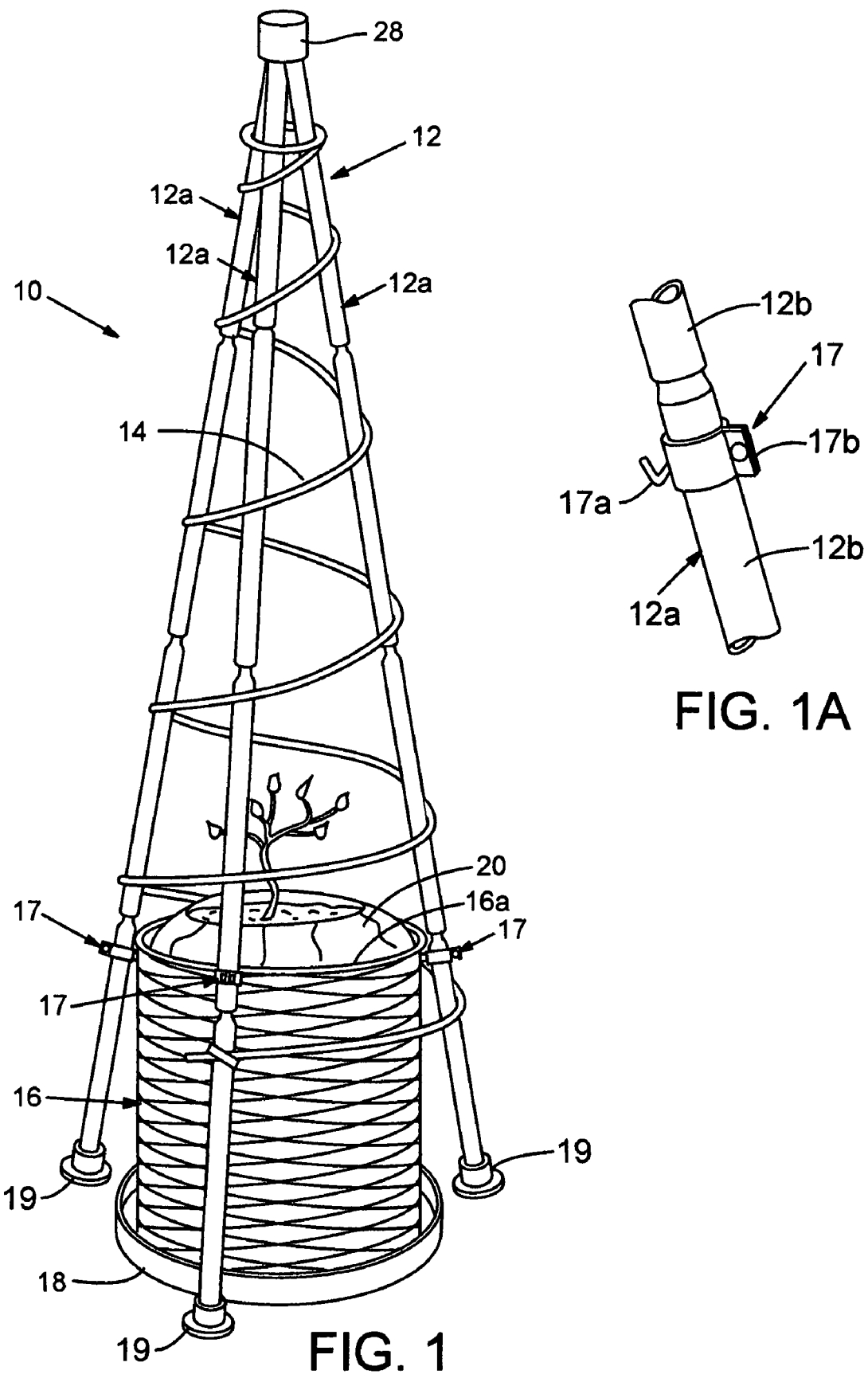
FIG. 1 is a perspective view showing a preferred embodiment of the invention, as erected.

FIG. 1 shows a tomato (or climbing plant) growing device 10 as erected and standing on a surface.

The kit of parts that results in the erected device 10 includes several components: a frame or tower 12, which may be made of three (or more) poles or stakes as shown, erectable preferably into a pyramid shape as shown, these poles or stakes being capable of being broken down easily into short pieces; a coil 14 to be engaged by the climbing vines, preferably (but not necessarily) in a tapered helix shape as shown and supported over the exterior of the erected tower or cage 12; and a collapsible mesh basket 16, for receiving a bag of potting soil and preferably with provision for attachment to the legs or stakes of the tower or cage 12, so as partially to support the weight of the mesh basket and potting soil from the tower and thus to increase stability. An optional fourth component is a water-catching saucer or tray 18 to be placed under the mesh basket or soil, to catch excess water so as to enable use of the device on a wooden porch or deck, or even inside a house or building.

Although details of the manner of erection of the cage or tower 12 from the illustrated plurality of poles or stakes 12a are not shown in the drawing, these poles can be jointed using pivots at a series of, for example, three or four locations along the length of the pole (each joint including a feature for holding the joint straight when erected) or the joints can be a series of connections where a lesser-diameter end of one section is press fit into a larger-diameter end of an adjacent section. In one form, each such joint can fit relatively loosely but with an internal elastic tension band pulling through the length of the erected pole, as in some tent poles, holding the pole in the linear erected position. Other types of jointing could be used, so long as the poles are capable of quick and easy erection and compact storage when broken down.

At the top of the three (or more) poles 12a, the poles can be held together by a tight-fitting end cap or collar that receives each of the pole ends, or by bolts or other fasteners, or by an elastic band resistant to exterior conditions, or by a clamp which may be similar to a hose clamp. Preferably some form of end cap is provided so that the pole ends are simply force fit into respective holes in the end cap to make a neat and secure connection.

The bottom ends of the poles 12a can be fitted with feet 19, if needed to prevent deeper penetration into a soft soil base, as mentioned above. These feet can simply comprise press-fit pads 19 that can be retained on the pole ends or removed, as desired.

The vine-supporting coil 14 can be formed of a relatively narrow-diameter plastic tubing which has a normal, unstretched configuration generally in a spiral plane. This could be, for example, a tubing of polypropylene, approximately ¼" to ½" in external diameter, or another other suitable plastic material that can withstand sunlight, heat and other exterior conditions. The coil belts could be formed of metal wire if desired. The spiral coil 14 is a substantially flat spiral in storage and pulls open to an extended vertical shape generally as shown in FIG. 1, the shape of a tapered helix. It can be connected near the upper end of the tower or cage 12 by any convenient connection such as a hook on the top end of the coil that engages over a protrusion on one of the poles or on the cap member (not shown in FIG. 1) at the upper end, as discussed above. It can be connected by a screw or bolt, it can hang on a hook protruding from one of the legs, it can be formed into a closed loop at the top to sit on the poles near the top ends of their pyramidal configuration, or any other simple connection means can be used. At the lower end, the coil 14 can simply hang by gravity, if the material is heavy enough to do so, or it can be secured to the legs or poles 12a using fasteners, clamps, or via a hook and eye, or simply by pulling and snapping the lowest turn of coil down around three protrusions, one extending outwardly on each leg. Although some plants, such as tomato plants, can produce fruit that is quite heavy, the vines engaging on the coil 14 generally tend to help hold the turns of coils in position on the tapered tower. If desired a positive connection to each leg at the bottom of the coil can be provided, such as a clamp, bolt, hook-and-eye or a fitting whose shape is dedicated to connection of the intersecting leg or coil.

At the lower end of the erected plant support structure 10 is the collapsible basket 16. This can be of a collapsible mesh that is similar to chain mail, although any mesh that is collapsible or flattenable and re-erectable, and which will resist invasion by vermin, will be suitable. A metal mesh known as knitted wire can be used. Another alternative is shade cloth or another permeable woven fiber mesh. The basket preferably has a relatively strong upper ring 16a at its top, this ring or rim serving to define the shape at the top of the basket and, in a preferred embodiment, to support part of the weight in the basket. The basket supports a bag of potting soil 20, or any soil which is suitable for growing the plant to be grown in this device. The basket can be of the appropriate size for retaining a one cubic foot or a two cubic foot bag of soil, for example.

In a preferred form of the invention the basket 16, which retains the bag of soil and thus considerable weight, is secured on the three (or more) legs 12a of the cage or tower, such as by bands or clamps 17 (as shown in FIG. 1A) appropriately positioned on the legs 12a to engage around the top ring 16a of the basket, such as with a hook 17a extending from the clamp. The clamp can be secured with a fastener 17b, as indicated. Alternatively, the legs can have built-on fittings, such as hooks, for this purpose. The bands or clamps or fittings preferably are movable up/down each leg as needed. Another type of fitting would be a clamp or bracket which comes already attached to the basket, each fitting including a clamp for engaging one of the legs in slidable/adjustable relationship. Even with the tripod configuration tapered as shown, the arrangement will permit some sliding adjustment so that the basket can be partially supported on the legs. With part of the weight of the basket supported from the legs, as noted above, greater stability is achieved for the entire erected structure, and better drainage is facilitated since the bottom of the bag and of the basket 16 will not be pressed as heavily against the surface on which the device is standing (or against a saucer or tray 18). With the clamps or fittings adjustable on the legs, the fittings can be forced upwardly and then set in place once the basket, soil bag and plant are in place, thus transferring part of the weight to the legs. A simple form of clamp 17 is shown in FIG. 1A. All of the above are considered as alternative means of attachment of the basket's upper end to the legs.

Figure 2:
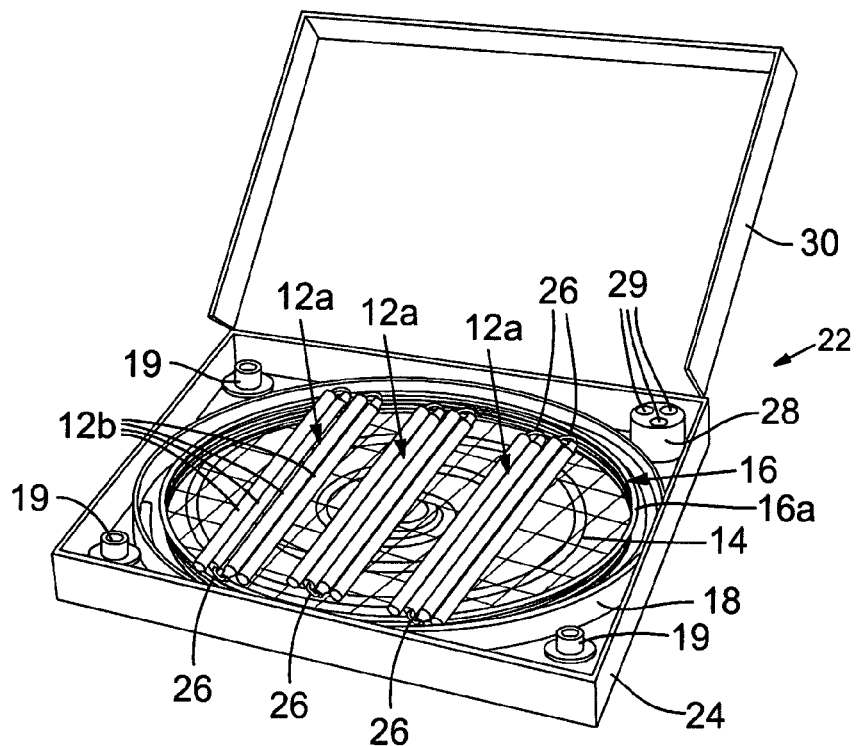
FIG. 2 is a schematic representation, in perspective, showing a box containing a kit of components to erect the tower or cage shown in FIG. 1.

FIG. 2 is a schematic representation of a kit of components for erecting the tomato growing cage or tower 10. The kit 22 is contained in a box 24, preferably about the size of a large pizza box; advertising on the box can relate to the pizza-tomato connection if desired. The box contains all of the components referred to above, and preferably is no greater than about four inches in height, more preferably no more than two inches or three inches. These components include the basket 16 in flattened configuration, the coil 14 stored in a spiral plane as shown, and tubular leg sections 12b, in this example shown as including an elastic member 26 inside each pole section, to retain the pole section in linear erected configuration in the manner similar to a tent pole, as discussed above. Only four leg sections are illustrated, although three to six sections could be included for each leg. Three or more such legs will be included.

FIG. 2 also shows schematically a hub or top cap 28 which is briefly discussed above, with three holes 29 appropriately angled to receive the upwardly converging triad of legs 12a. Other means can be used for connecting the top ends of the legs together as noted above.

A saucer or tray 18, as discussed above, can also be included in the kit of components if desired.

In a variation of the system described, the coil 14 could be replaced with a simple series of approximately three to seven simple hoops of different diameters, but the single component of a coil is preferred. Also, in the erected configuration, instead of the potting soil bag, a standard planting pot (of plastic or clay material, for example), could be placed within the mesh basket 16 (such a rigid pot preferably would not be included in the box of components). Other variations are discussed above, as well as below.

It should be understood that the components within the box 24 will also include any further fittings as needed and as discussed above. The box 24 will have a lid or cover 30, which can be a fold-over cover as in a pizza box.

To erect the tomato growing tower or cage, one simply removes the pole sections 12b from the box 24 and erects the three poles or legs into linear configuration, then attaches the tops of the poles together (whether by the cap 28 or by other means discussed above). The coil 14 is then dropped down over the top of the three-legged assembly and can be secured in a desired manner, which can vary as discussed above, or it can simply hang down to engage against the legs. The wire basket 16 is deployed into the generally cylindrical shape as shown in FIG. 1 (or a tapered shape), and is attached to the legs 12a as discussed above. A bag of potting soil or other suitable soil is then perforated at its bottom for drainage and opened at its top, then placed into the basket 16. The plastic sheet material of the bag 20 preferably is simply left in place. To place the bag in the basket the lower end of the coil 14 can be raised, or the bag can be placed prior to placing the coil on the tower. Plants are placed in the soil in the basket, and the plants are watered. The fittings or clamps holding the basket to the legs can then be raised and adjusted to put weight on the legs. As noted above, a saucer or water-catching tray 18 can be used beneath the bag and basket if desired, especially if the tower is used inside.

Figure 3:
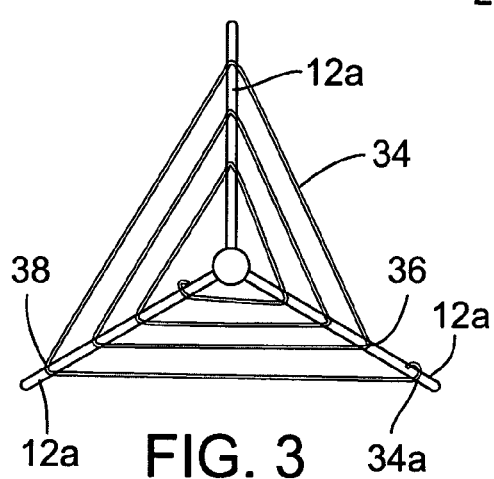
FIG. 3 is a top plan schematic view showing an alternative embodiment.
Figure 4:
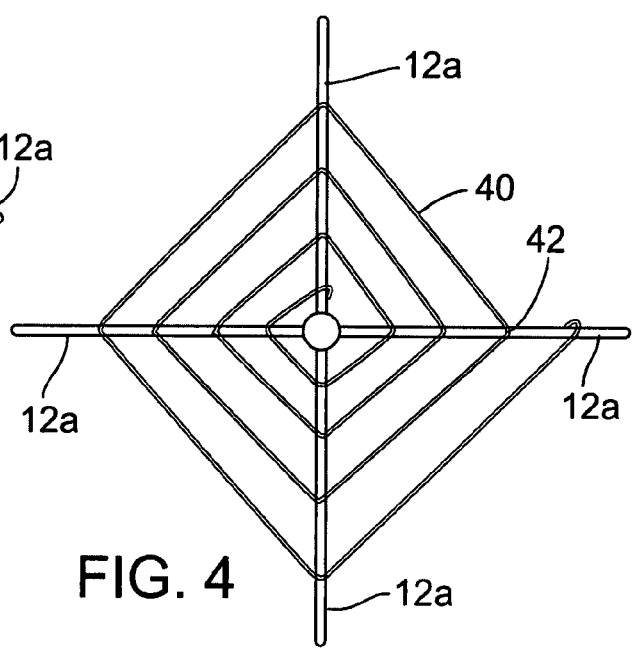
FIG. 4 is another top plan view, showing a further alternative embodiment.

FIGS. 3 and 4 show other alternatives relative to the coil 14 shown in FIGS. 1 and 2. In FIG. 3, an alternative form of "coil" or climbing wire 34 is formed into a generally triangular (but spiraling) shape, with creased and formed corners 36, 38, etc. This climbing wire will still flatten into the box such as shown in FIG. 2, and when opened and hung on the three legs 12a will provide relatively rigid and secure corners to engage with the legs. The legs can be adjusted after the climbing wire 34 is installed, so that each leg firmly engages in the respective corner. At the lower end of the device the end 34a of the climbing wire can be secured to the leg 12a, if desired.

FIG. 4 is generally similar to FIG. 3, again showing a plant growing device in top plan view, but in this case the device has four legs 12a. A climbing wire 40 is shown, again with sharply formed corners 42 which appear square in this plan view. The climbing wire 40 can be installed in the manner described above for FIG. 3.

Another feature of the invention is that the towers or tripods can be ganged together side by side and in a pattern or matrix if desired, with legs of adjacent tripods retained together in a foot member with several sockets (not shown), similar to the hub 28 but inverted.

Figure 5:
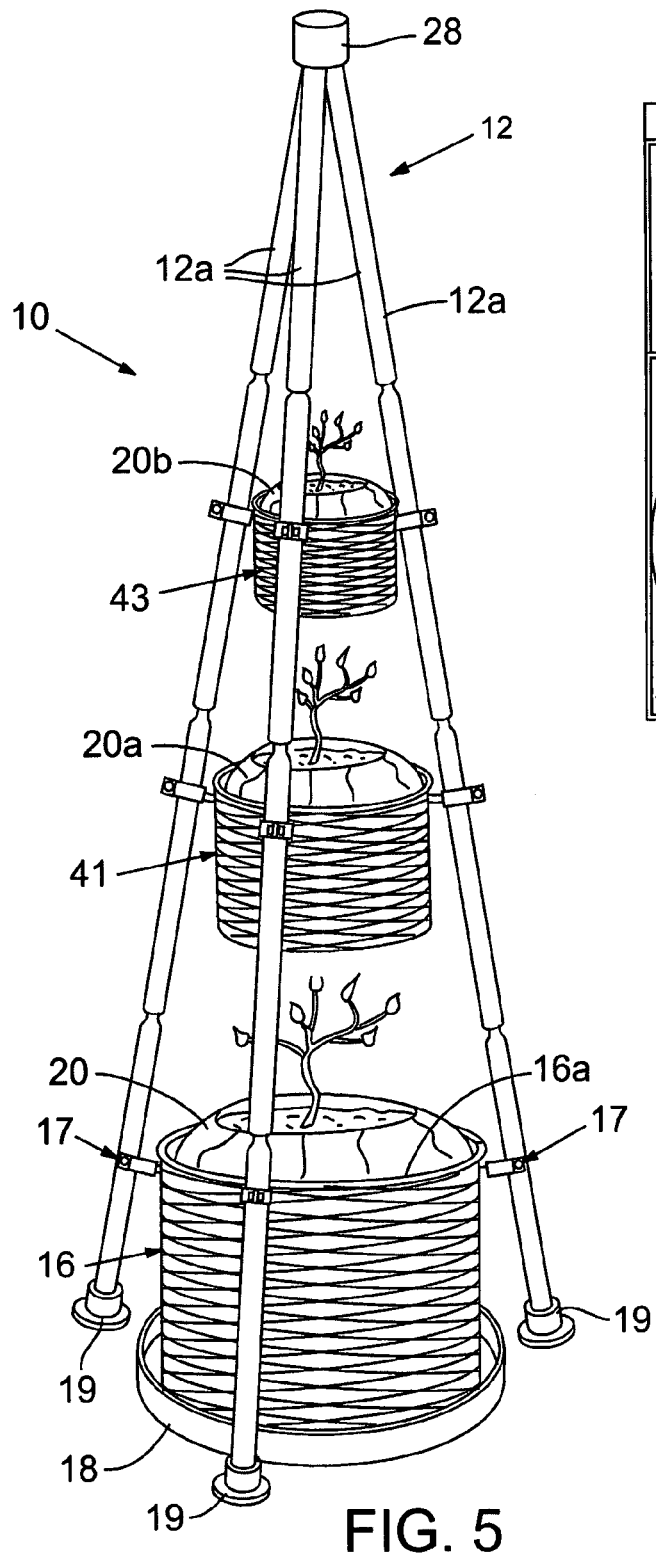
FIG. 5 is a schematic view in perspective showing an embodiment of the invention wherein a tripod holds multiple baskets at different levels, which can be for climbing or non-climbing plants.

FIG. 5 shows a variation wherein the growing cage or tower 12 supports multiple soil bags 20, 20a and 20b, in baskets 16, 41 and 43. The baskets are attached to the legs 12a by any appropriate means such as discussed above; the upper basket or baskets 41, 43 can be attached via hooks on the legs, or hooks on the baskets engaged with protrusions on the legs. In this way a multi-level floral display can be achieved, or multiple levels of other plants. Generally tomatoes will not need such multiple levels because they are vigorous climbers. In the case of multiple levels the upper level(s) 41 and/or 43 will usually have smaller quantities (i.e. weights) of soil, as indicated. FIG. 5 shows no vine-attachment element 14 such as in FIG. 1, although one can be included. Non-climbing plants do not require this element, but one may want to include the element for climbing flowering plants such as morning glories, in order to produce a nearly solid cone of foliage and flowers.

Another feature of the invention is that the tower or tripod assembly 10 of FIG. 1 or FIG. 5 can be covered, with a clear plastic cover as an accessory to the kit of parts. This cover, optionally used, creates a form of greenhouse for starting plants and getting an early start on the growing season. A further feature is that, with the cover installed as described, carbon dioxide can be distributed into the greenhouse space defined by the cover. The spiral vine-attachment element 14 can be a tube with holes capable of distributing the carbon dioxide appropriately to the space. Thus, the tube can be a small metal tube or, more preferably, a plastic tube with the distribution holes. With an atmosphere rich in carbon dioxide, growing time can be decreased significantly. Carbon dioxide can be distributed from a tank (a very slow rate of flow is normally sufficient), or a simple carbon dioxide generator can be included in the kit of the invention, using a base and an acid such as baking soda and vinegar.

Figure 6:
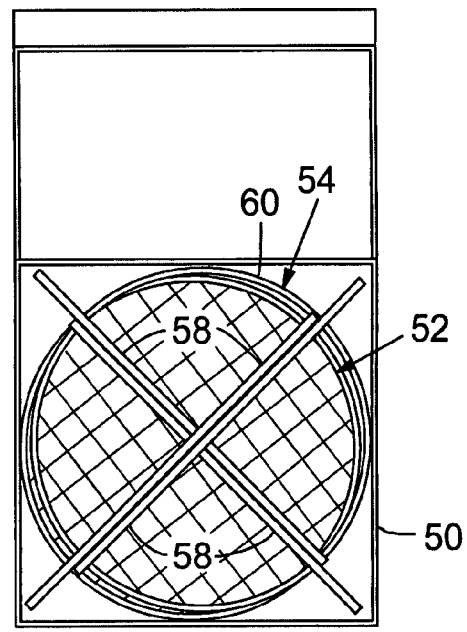
FIG. 6 is a view showing a set of parts in a box, in a modified form of the invention which does not include a tripod or vine-attachment element.
Figure 7:
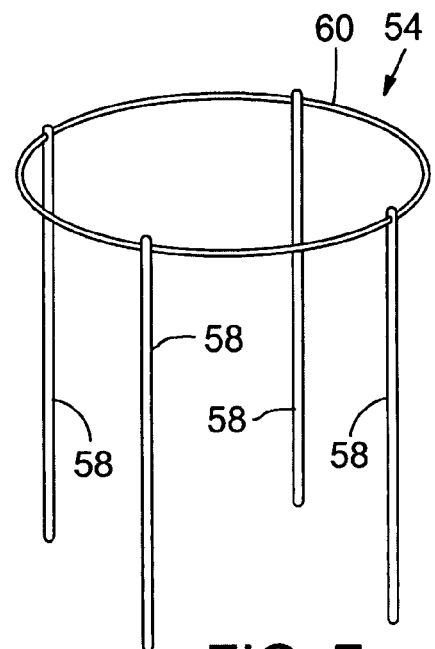
FIG. 7 is a perspective view showing one of the components of the embodiment of FIG. 6.

FIG. 6, somewhat similar to FIG. 2, shows a minimal kit of parts compactly contained within a box 50. This set of components includes a collapsible basket 52 (which could also take the other forms described above) for holding a bag of soil when the basket is erected, and a support or frame 54 which is also collapsible or dismantleable into a flat configuration for storage in the box or container 50. One example of a form the support or frame can take when erected is shown schematically in FIG. 7. A set of legs 58 are pivotly attached to a base 60 and, when the components are removed from the box 50, these legs are swung upwardly or downwardly and locked by appropriate mechanical means (not shown) to hold the basket in the deployed, deep configuration suitable for receiving a bag of potting soil, with the plastic bag retained over the soil and simply placed into the basket. The basket can be large enough at its top so as not to fit through the frame base ring 60, if the ring forms the top of the frame as in FIG. 7, so that one simply drops the basket into the frame. The legs 58 can be pushed into the ground, or further bracing could be provide so the frame is free-standing.

Certain terms used in this description, as well as in the claims, should be understood in a broad sense. The term vine-attaching or attachment element refers to either one integral wire or spiral (erectable to tapered helical) tube or other elongated member, or to a series of separate rings, triangles or other elements, either of which can essentially form tiers over the erected tripod configuration. Further, the term tripod is intended to include more than a three legged configuration. For example, a four legged pyramid configuration attached generally at a point at the top end, it is to be understood as included within the term "tripod configuration".

Also, the term basket is intended to mean a woven basket, a wire basket, a chain mail basket, woven fiber mesh like cloth, or some form of solid basket, so long as the basket includes perforation or porosity for drainage and is generally flattenable. The term includes any form of open-topped structure capable of retaining a bag of soil, at least when the basket is held in an erected configuration (as by tripod legs or a frame or other structure retaining the top edge of the basket in the raised position desired), with such structure being collapsible so as to be stored in a relatively thin container as described.

The above described preferred embodiments are intended to illustrate the principles of the invention, but not to limit its scope. Other embodiments and variations to these preferred embodiments will be apparent to those skilled in the art and may be made without departing from the spirit and scope of the invention.

I claim:

1. A kit of parts for erecting a growing cage for climbing plants, comprising:
   a container in the form of a flat box, no more than about four inches in height,
   a set of at least three erectable straight legs within the box, each leg being in sections and including provision for erecting each leg without tools and for connecting the three legs together without tools into a tripod configuration,
   a flexible vine-attachment element capable of making essentially a series of tiers around the tripod configuration when the legs are so erected, for vine attachment onto the series of tiers when the element is assembled onto the legs by resting the element on the legs in the erected tripod configuration to retain the element in place solely by gravity, the flexible element being in generally flattened condition within the box, and
   a collapsible basket in generally flattened condition within the box, the basket having an open upper end and a closed but water-permeable bottom end and being expandable into a deep basket configuration,
   and the legs including, at attachment points near lower ends of the legs, weight-supporting hooks positioned to directly engage and support the basket at a height such that, when the legs are erected into the tripod configuration, and with weight of plants and soil in the basket, the basket's bottom end will rest against ground or other surface while the basket's weight is also partially supported by the hooks,
   whereby a consumer can open the box, erect the legs into the tripod configuration with the legs converging to meet together at a top end, attach the basket to the legs via the hooks and place soil in the basket, and climbing plants may be planted in the soil and, with the vine-attachment element in place, allowed to climb up along the legs and the vine-attachment element.

2. A kit of parts as in claim 1, wherein the vine-attachment element comprises a series of at least three separate annular rings of different diameters, sized to engage onto the erected legs at different heights.

3. A kit of parts as in claim 1, wherein the vine-attachment element comprises a single elongated flexible coil, generally spiral in shape in flattened condition within the box and erectable into generally a tapering helix when connected to the legs erected in the tripod configuration.

4. A kit of parts as in claim 1, wherein the basket comprises a loosely formed wire mesh basket capable of substantial flattening for storage in the box and openable into the deep basket shape.

5. A kit of parts as in claim 1, wherein the basket comprises a bag formed of biodegradable material.

6. A kit of parts as in claim 1, wherein the basket is formed of a woven permeable fiber mesh.

7. A kit of parts as in claim 1, wherein the basket is formed of chain mail or knitted wire mesh.

8. A kit of parts as in claim 1, wherein the vine-attachment element is formed of plastic tube.

9. A kit of parts as in claim 1, wherein the vine-attachment element comprises metal wire.

10. A kit of parts as in claim 1, wherein the legs are formed of aluminum or plastic tubing.

11. A kit of parts as in claim 10, wherein each leg is in multiple short leg sections within the box, with ends of leg sections closely fittable within ends of other leg sections to form the legs.

12. A kit of parts as in claim 1, wherein the legs are formed of biodegradable material.

13. A kit of parts as in claim 1, wherein the legs are formed of plastic tubing material, each leg being in multiple short leg sections within the box that can be fitted together to form the erected growing cage.

14. A kit of parts as in claim 1, wherein each leg comprises multiple short leg tube sections within the box, with ends fittable together, and with a tension member within the leg sections of each leg to hold the leg in erected configuration once the leg is linear.

15. A kit of parts as in claim 1, further including a top end fitting to secure the top ends of the legs together, the top end fitting having a plurality of sockets, one for receiving the top end of each leg.

16. A kit of parts as in claim 1, wherein the height of the box is no more than about two inches.

17. A kit of parts as in claim 1, wherein the box is rectangular, with each of length and width no greater than about two feet.

18. A kit of parts as in claim 1, wherein the upper end of the basket includes a substantially rigid ring, the hooks on the legs being positioned to receive the substantially rigid ring.

19. A kit of parts as in claim 1, wherein the legs are formed of fiber-reinforced plastic material, each leg being in multiple short leg sections within the box that can be fitted together to form the erected growing cage.

20. A kit of parts as in claim 1, wherein the vine-attaching element comprises a series of at least three separate annular rings of different diameters, sized to engage onto the erected legs at different heights, and the legs including hooks extending inwardly on the leg sections of each leg to provide for engaging the rings at each of the different heights.

21. A kit of parts as in claim 1, further including a foot pad having a plurality of sockets sized and angled to receive a bottom end of a leg of the erected growing cage and also a leg of a similar erected growing cage positioned directly adjacent.

22. A kit of parts as in claim 21, further including at least a second basket of a size to be positioned at an upper location on the erected growing cage, for containing soil and an additional plant.

23. A method for erecting a growing cage for climbing plants from a compactly stored kit of parts contained in a box, and for growing a climbing plant on the growing cage, comprising:

providing a container in the form of a flat box, no more than about four inches in height, a set of at least three erectable legs within the box, each leg being in sections and including provision for erecting each leg without tools and for connecting the three legs together without tools into a tripod configuration, a flexible vine-attachment element capable of making essentially a series of tiers around the tripod configuration when the legs are so erected, for vine attachment onto the series of tiers when the element is assembled onto the legs by resting the element on the legs in the erected tripod configuration to retain the element in place solely by gravity, the flexible element being in generally flattened condition within the box, and a collapsible basket in generally flattened condition within the box, the basket having an open upper end and a water-permeable bottom end and being expandable into a deep basket configuration, opening the box and removing the erectable legs, vine-attachment element and collapsible basket from the box, connecting the leg sections of each leg together to form at least three straight erected legs, and erecting the legs into the tripod configuration with the legs converging to meet together at a top end, placing the basket within a space defined by the tripod and attaching the basket to the legs near lower ends of the legs, the connection of the legs to the basket being via weight-supporting hooks extending from the legs and directly attached to the basket and establishing a height of the basket such that, once soil and plants are supported in the basket, the basket's bottom end will rest against ground or other surface while the weight of the basket is also partially supported by the hooks on the legs, placing the flexible vine-attachment element onto the tripod such that the vine-attachment element is retained on the tripod by gravity, and placing soil in the basket, and a climbing plant in the soil such that the bottom end of the basket rests against ground or other surface while the basket's weight is partially supported on the legs, and allowing the vine to climb up along the legs and the vine-attachment element.

24. The method of claim 23, wherein the flexible vine-attachment element comprises a series of at least three separate annular rings of different diameters, and the step of placing the flexible vine-attachment element onto the tripod comprises laying the annular rings over the top of the tripod such that they fall into place at different heights due to their different diameters.

* * * * *